No. 845,094. PATENTED FEB. 26, 1907.
H. JEZLER.
CLUTCH.
APPLICATION FILED FEB. 1, 1906.

Witnesses: Inventor:
H. L. Amer. Hubert Jezler.
B. Dommers by [signature] atty.

UNITED STATES PATENT OFFICE.

HUBERT JEZLER, OF ZURICH, SWITZERLAND.

CLUTCH.

No. 845,094.  Specification of Letters Patent.  Patented Feb. 26, 1907.

Application filed February 1, 1906. Serial No. 298,944.

*To all whom it may concern:*

Be it known that I, HUBERT JEZLER, a citizen of the Republic of Switzerland, residing at Zurich, in Switzerland, have invented new and useful Improvements in Clutches, of which the following is a specification.

The subject-matter of this invention is an elastic two-part clutch for the transmission of rotary movement.

For the purpose of connecting the two clutch parts or halves of the clutch there are located between the halves of the clutch at least three pairs of conical saucer-like paths turned toward each other, a ball being arranged between each two opposite saucer-like paths comprising a pair and means being provided which tend to press the oppositely-lying saucer-like paths toward one another concentrically in such manner that, on the one hand, rotary movement is transmitted by the balls and paths from one half of the clutch to the other half thereof and that, on the other hand, the movement away from each other of the oppositely-lying paths, which takes place upon the transmission of the rotary movement by overcoming the elastic pressure, results in the two clutch-halves being caused to take up an eccentric position; but the elastic pressure on the saucer-like paths of the balls always tends to center the clutch-halves again.

The accompanying drawings show, by way of example, a constructional form of clutch according to this invention adapted to serve as a running-wheel.

Figure 1:
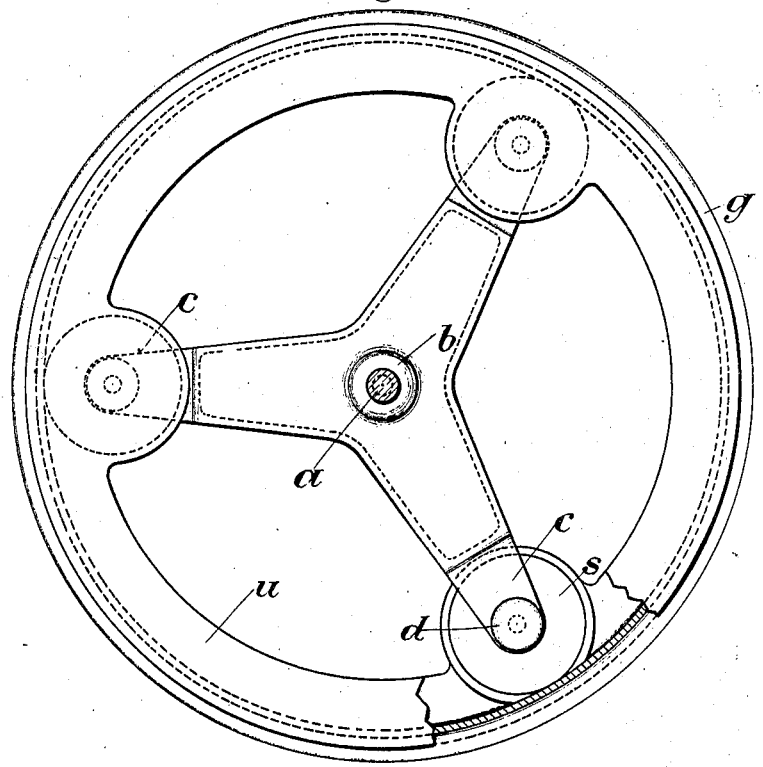
Figure 2:
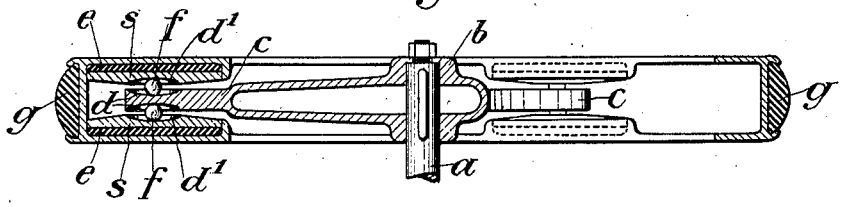
Figure 3:
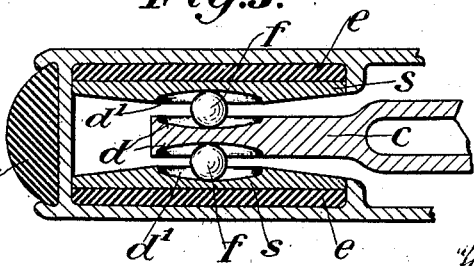

Figure 1 is a view, partly in side elevation and partly in vertical section. Fig. 2 is a central horizontal section of Fig. 1. Fig. 3 shows a detail to a larger scale.

In the example shown one half of the clutch forms the spokes of a running-wheel and the other half of the clutch the felly $u$ of the wheel. That half of the clutch including the wheel-spoke, is keyed upon an axle $a$ and is formed with a hub $b$, around which are symmetrically arranged three arms $c$ of equal length, flattened on both sides to form the wheel-spokes. Upon each of the flat sides of each arm end is formed a shallow conical saucer-like path $d$, and the spoke ends each project between two corresponding and oppositely-lying disks $s$, which are removably mounted in the felly $u$ of the wheel in a plane at right angles to the wheel-axle but are prevented from moving relatively to the wheel-felly. The felly is furnished with a rubber tire $g$ as a running-ring. The disks $s$ have on their front sides saucer-like paths $d'$, which are of the same shape as the paths $d$ and are located opposite to them.

$f\ f$ are balls inserted in the capsule-like part chambers formed, on the one hand, by the paths $d'$ of the disks $s$ and, on the other hand, by the paths $d$ of the wheel-spokes. These balls serve to transmit rotary movement from one half of the clutch to the other and are clamped between the saucer-like paths by rubber plates $e$, laid behind the disks $s$.

The working of the hereinbefore-described clutch constructed as a running-wheel is as follows: As will be seen from the foregoing description with reference to the drawings, the wheel-spokes are not connected directly and rigidly to the felly, but are, together with the axle, elastically suspended in the felly by the balls elastically clamped between the saucer-like paths. In consequence of this elastic suspension of the wheel-spokes and the axle the two parts of the wheel assume, during the rotation of the wheel and under the influence of rotary force, the load on the axle, and the shocks arising from the road, continuously-changing positions more or less eccentric to one another, the balls $f$ rolling round on their saucer-like paths in more or less eccentric paths. The size of these eccentric ball-paths depends upon the rotary force of the wheel-spokes, upon the load on the axle, and upon the shocks of the road. It also depends upon the pressure of the rubber plates $e$ toward the balls. The balls moved out of the deepest point of the saucer-like depressions tend under the elastic pressure of the rubber plates to always bring back the displaced saucer-like paths, and with them the whole of the wheel-spokes into the original position. In addition to this the office of the saucer-like paths and balls is to provide for efficient lateral guidance of the felly with respect to the wheel-spokes with as little friction as possible.

During the running of the wheel upon the road or street the wheel-spokes always maintain a more or less eccentric position. The balls run at the same time with a relatively small speed in their capsule-like chambers and hold the wheel-spokes together with the axle in an elastic suspended position inside the felly, and thereby afford an elastic support to the load. Shocks arising from the unevenness of the road are in consequence of the elastic suspension of the wheel-spokes alleviated and elastically transmitted to the axle. By this means and in conjunction with what has been hereinbefore more fully described rubber tires and carriage-springs are rendered superfluous when the hereinbefore-described wheel is employed for motor and goods vehicles intended to run at low speed, and in the case of motor and goods vehicles intended to run at medium speed rubber tires $g$ (see drawings) are only necessary to mitigate the noise, while in the case of vehicles intended to run at high speed a materially smoother running is produced by the use of pneumatic tires than is possible with their use alone—that is to say, without the elastic suspension of the wheel-spokes.

At the same time in the latter case, owing to the smoother running and the shock being taken up elastically and free driving, the pneumatic tires are preserved in an adequate manner.

To prevent dust and dirt from penetrating into the interior of the running-wheel, it may be provided with a suitable covering.

Clutches constructed according to this invention are also suitable for coupling up shafts, especially those whose axes are not exactly in line or concentric or whose position in relation to each other does not always remain the same.

It may be also mentioned that the wheel-spokes may number more than three and that the number of the saucer-like paths and balls may be suitably increased; furthermore, that such paths and balls consist, preferably, of hardened steel and that instead of the rubber plates flat or spiral springs may be arranged, as well as that the arrangement of the saucer-like paths may be different from that shown in the drawings, it being only necessary in the last-mentioned case that the one half of the clutch shall have on both sides of a plane cutting the axis of rotation of the clutch vertically a plurality of saucer-like paths retiring from the plane and that the other half of the clutch be provided with corresponding paths, the number and arrangement of which are such that each saucer-like path is opposite one of the corresponding paths turned toward it.

The felly $u$ may be in two parts for the purpose of being more easily put together; but the pieces $f$ $e$ $s$ may be inserted through holes provided with covers which can be unscrewed therefrom.

Having now particularly described and ascertained the nature of the said invention and in what manner the same is to be performed, I declare that what I claim is—

1. In an elastic clutch a central transmitting device having saucer-like depressions on each side opposite each other, a driven member, plates mounted at the periphery thereof having similar depressions opposite those in the transmitting member, rubber cushions to exert a pressure on the plates toward the depressions on the transmitting device, and a ball in each lenticular pocket formed by the oppositely-situated depressions, substantially as described.

2. In an elastic clutch a central hub having arms projecting therefrom, having oppositely-situated depressions on the sides of the arms, a circular driven rim having seats therein, disks mounted one opposite each depression in the arms and having similar depressions, elastic means between the disks and rim to force said disks toward the arms and a ball in each lenticular pocket formed by the oppositely-situated depressions, substantially as described.

In testimony whereof I have signed my name to this specification in the presence of two subscribing witnesses.

HUBERT JEZLER.

Witnesses:
 ROBERT BECK,
 E. BLUM.